UNITED STATES PATENT OFFICE.

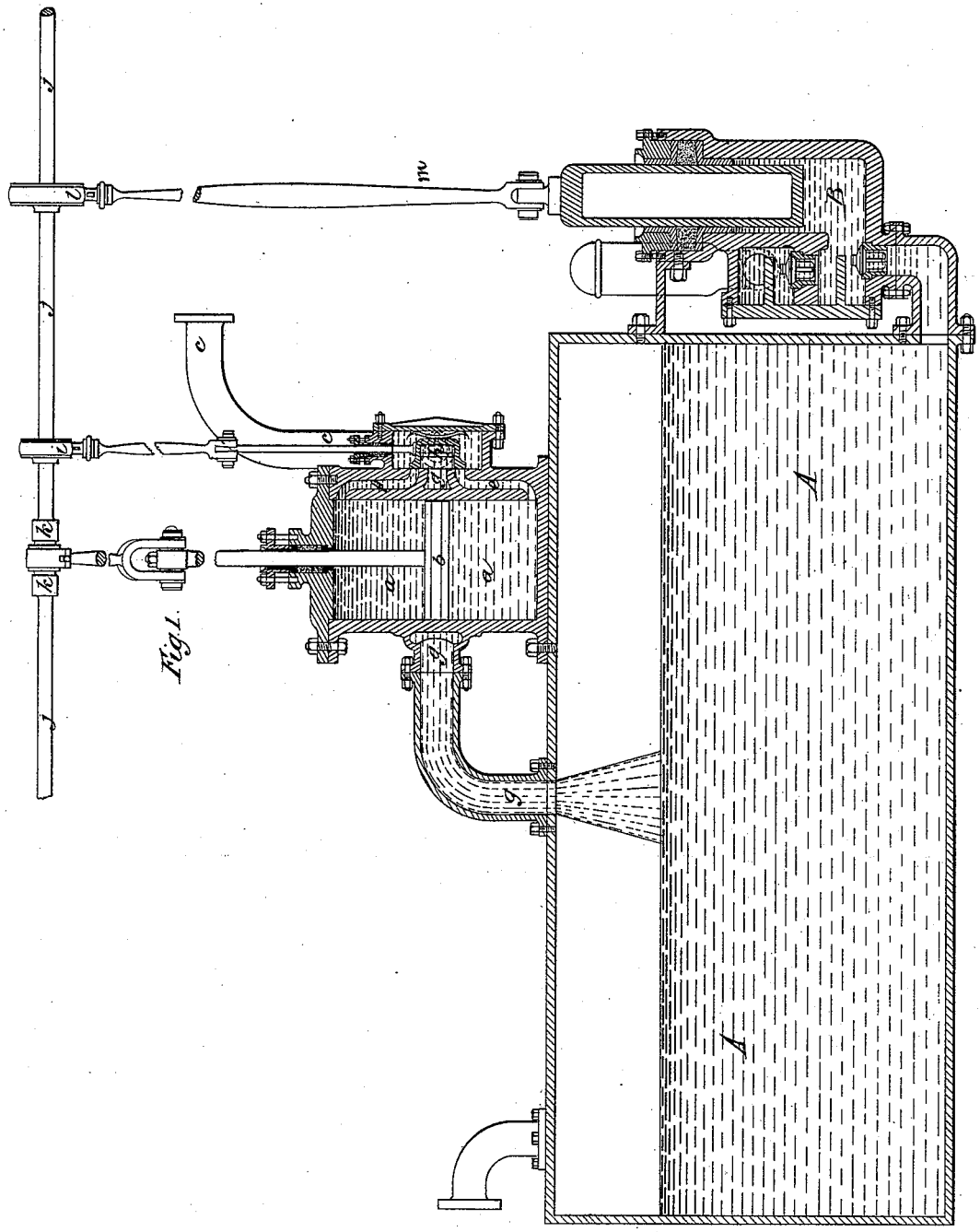

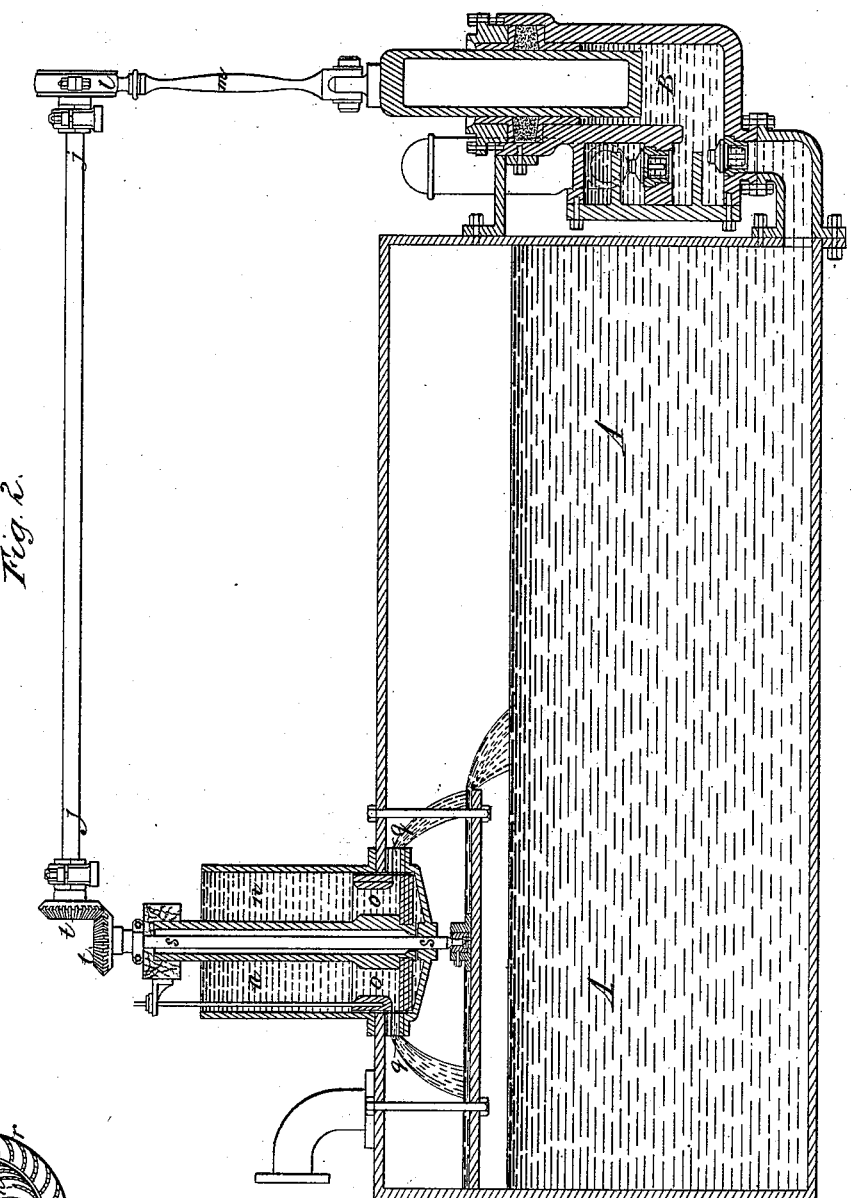

MARCELLUS BAILEY, OF WASHINGTON, DISTRICT OF COLUMBIA, ADMINISTRATOR OF JAMES YOUNG, DECEASED.

PROCESS OF PRODUCING CURRENTS OF LIQUIDS IN VACUO.

SPECIFICATION forming part of Letters Patent No. 352,287, dated November 9, 1886.

Application filed April 29, 1884. Serial No. 129,727. (No model.) Patented in England January 20, 1883, No. 332.

*To all whom it may concern:*

Be it known that JAMES YOUNG, late of Kelly, North Britain, London, England, deceased, did in his lifetime invent certain new and useful Improvements in the Treatment of Sewage and other Liquids and in Apparatus to be Used Therefor, (for which the said deceased James Young received Letters Patent of the United Kingdom of Great Britain and Ireland, No. 332, dated January 20, 1883,) of which the following is a full, clear, and exact description.

This invention relates to improvements in the treatment of sewage and other liquids—such as refuse from the beet-sugar manufacture—in order to obtain ammonia therefrom, and in the apparatus to be used therefor is a development of the invention for which Letters Patent of the United Kingdom of Great Britain and Ireland were granted to the said James Young, No. 3,562 of the year 1882.

Under the present improvements a partial vacuum is formed for the purpose of enabling the sewage to be boiled at a low temperature. The existence of this vacuum is utilized, together with the pressure of the atmosphere, as a means of forcing through the apparatus the sewage or other liquid being treated therein for the purpose of separating therefrom the ammonia and other products. This is effected by allowing the atmosphere to act upon the ingoing sewage or other liquid pressing on one side of a piston against the vacuum and utilizing the motive power thereby obtained to force or draw the sewage or other liquid being treated through the apparatus. The motive power thus produced by the difference in pressure of the atmosphere without and the vacuum or partial vacuum within the apparatus may not be sufficient to cause the necessary motion or flow of the liquid, in which case it is necessary to supplement the motive power, which may be effected by any convenient or suitable means.

In the drawings, Figure 1 is a section of one form of engine which may be used in the carrying out of the invention. Fig. 2 is a section of another form of engine which may be used in the carrying out of this invention. Fig. 3 is a horizontal section of a part of the mechanism represented at Fig. 2.

If a complete vacuum exist in the vessel A, the liquid will be forced into it by the atmospheric pressure of fifteen pounds per square inch, (in addition to any pressure arising from difference of level,) and in withdrawing it from the vessel an equal atmospheric pressure has to be overcome. If the outflow-pipe from the apparatus contain a column of water of perpendicular height sufficient to balance this atmospheric pressure, (generally about thirty-three feet,) the liquid will flow from the vessel without assistance; but where this condition does not exist a pump or some similar appliance will be necessary to effect its withdrawal; and a part of the present invention consists in the application of the mechanism for working this pump by motive power generated by the pressure of the atmosphere upon the liquid entering the vessel, this effective working pressure being equal to the difference between the pressure inside and outside of the vessel A.

In carrying this invention into practice the atmospheric pressure is first converted into motive power by causing it to work a water-engine or a turbine, and the motion thus obtained is communicated to the pump, by which the liquid is withdrawn from another part of the apparatus. Two methods by which this may be effected are shown on the accompanying sheets of drawings, on Sheet 1 of which is represented a water-engine with the cylinder *a* and piston *b* placed upon the top of the vessel A, and through which engine the sewage or other ammoniacal liquid is admitted to the vessel A. This engine is connected in any suitable manner with the pump D, which is provided for the withdrawal of the sewage or other liquid at the bottom of the apparatus. While working, the sewage or other liquid is admitted by the feed-pipe *c* to the valve-chest *d*. This valve-chest *d* communicates with the lower and upper portions of the cylinder *a* by the ports *e* and *f*, respectively, and also with the vessel A by the pipe *g*, which passes round the back of the cylinder *a*, and serves both as an exhaust-pipe and as a water-way between the cylinder *a* and the vessel A. The connections between the valve-chest *d*, cylinder *a*, and exhausts *g* are regulated by a slide-valve, *h*, operated by the eccentric *i* on the main shaft *j*.

The slide-valve h is so arranged that when the piston b is rising from the bottom to the top of the cylinder a the lower port, e, is open only to the valve-chest d and supply-pipe c, while the upper port, f, is open to the exhaust g and, consequently, to the vessel A. The piston b is accordingly forced upward with a pressure of fifteen pounds per square inch, together with an additional pressure due to the height of the water in the supply-pipe, and the lower portion of the cylinder fills with the liquid to be treated in the vessel A. On the piston b reaching the top of the stroke the process is reversed, the upper port, f, connecting with the supply-pipe c and the lower, e, with the vacuum formed in the vessel A. The piston b consequently descends, and the liquid below it passes through the exhaust-pipe g into the vessel A. The reciprocal motion thus obtained is either communicated directly by a horizontal beam to the pump B, by which the liquid is withdrawn from the bottom of the vessel A, or indirectly, (as represented on the accompanying drawings,) by converting it into a rotary motion by means of the crank k and shaft j, and thence to the pump B by means of the eccentric l and eccentric-rod m, or by any other suitable means.

With reference to Figs. 2 and 3, Sheet 2, of the accompanying drawings, the mechanism there shown constitutes a turbine, which may be used in the place of the water-engine herein last described. It consists of an outer reservoir, n, communicating with a lower chamber, o, containing a number of curved partitions p, as represented in horizontal section at Fig. 3. This portion of the apparatus—that is to say, the chamber o, and with it the partitions p—is held in position by any suitable means, and the hollow wheel q, divided by the partitions r, curved in the opposite direction, is keyed or otherwise suitably secured to the vertical shaft s. This wheel q is supported in such a manner that it may rotate round the chamber o, with its inner circumference close to, but not touching, the outer circumference of the chamber o. A vacuum being obtained in the vessel A, and the sewage or other liquid to be treated introduced into the reservoir n, it is forced by a pressure of fifteen pounds per square inch—that is to say, the pressure of the atmosphere, in addition to any pressure due to the depth of the vessel—through the curved compartments of the chamber o, and the incoming sewage or other liquid is thereby projected with the same force against the opposing curved partitions r of the wheel q. This causes the wheel q to revolve, and the motion thus produced is transmitted by the vertical shaft s and by means of the bevel-wheels t to the horizontal shaft j, and thence to the pump B, as hereinbefore described with reference to the pump B represented at Fig. 1.

It is to be understood that the two forms of apparatus herein described, and shown on the accompanying drawings, are only illustrative of the manner in which the invention may be carried out. Any other known form of water-engine, Barker's mill or turbine, by means of which water-pressure is converted into mechanical motion may be applied for the carrying out of these improvements.

It is also to be noted that unless there is on the whole a considerable fall which can be taken advantage of in passing the liquid through the apparatus, the motive power obtained in the way described will require to be supplemented from some other source, owing to the unavailable loss of power experienced in transmission.

It is to be observed, in conclusion, that the carrying out of this invention is not limited to the precise form or detail hereinbefore described, and shown on the accompanying drawings, as the same may be varied in many ways without departure from the invention.

What is claimed is—

The improvement in the process of separating ammonia from sewage or other liquids, which consists in maintaining a vacuum in the vessels in which the separation takes place and applying the force of the liquid entering the vacuum to remove the liquid from the vessel by suitable apparatus, substantially as described.

In testimony whereof I have hereunto set my hand this 28th day of April, 1884.

MARCELLUS BAILEY,
*Administrator of the estate of James Young, deceased.*

Witnesses:
EWELL A. DICK,
W. H. GATES.